Patented Oct. 7, 1952

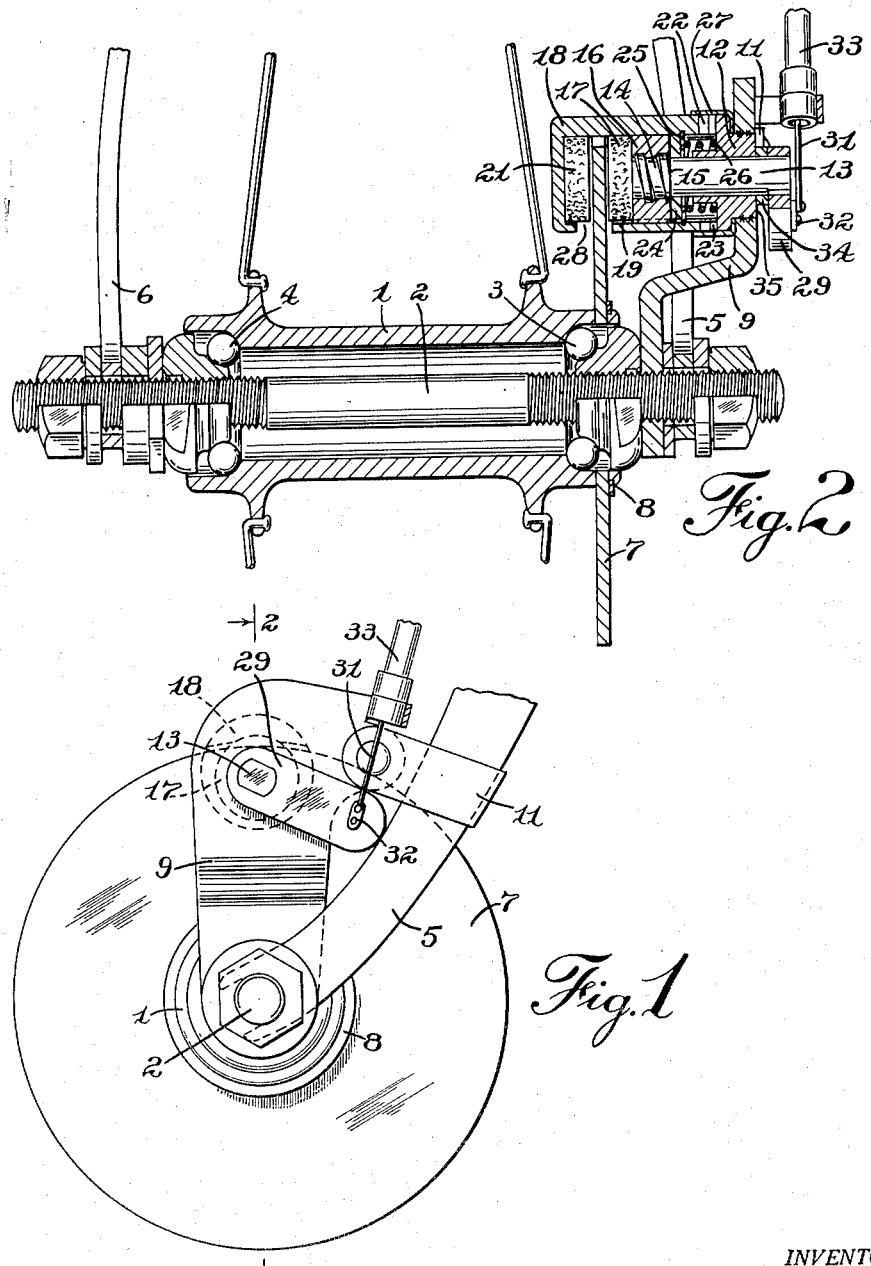

2,612,968

UNITED STATES PATENT OFFICE 2,612,968

VEHICLE WHEEL BRAKE

E. Elliott Hood, Elmira, N. Y., assignor to Bendix Aviation Corporation, a corporation of Delaware Application August 21, 1950, Serial No. 180,615

7 Claims. (Cl. 188—26)

The present invention relates to a vehicle wheel brake, and more particularly to a high unit-pressure type of disc brake particularly adapted for the front wheels of vehicles and the like.

It is an object of the present invention to provide a novel disc brake for velocipedes which is efficient and reliable in operation, and simple and economical in construction.

It is another object to provide such a device including a pair of brake pads which are applied to opposite sides of a brake disc by a manually-operated screw-jack mechanism.

It is another object to provide such a device incorporating provisions for anchoring the brake mechanism to the frame of the vehicle while insuring equalization of the braking pressure on the opposite sides of the brake disc.

Further objects and advantages will be apparent from the following description taken in connection with the accompanying drawing in which:

Fig. 1 is a side elevation of a preferred embodiment of the invention as applied to the front wheel of a velocipede;

Fig. 2 is a section taken substantially on the line 2—2 of Fig. 1.

In Fig. 2 of the drawing there is illustarted a portion of a bicycle wheel having a hub 1 which is rotatably mounted on an axle 2 by means of anti-friction bearings 3 and 4. The axle 2 is fixedly mounted in a frame member of the vehicle such as the front fork of a bicycle, the tines of which are shown at 5 and 6.

A brake disc 7 is rigidly mounted on one end of the hub 1 as shown at 8, and a supporting bracket member 9 is fixedly mounted on the axle 2 adjacent the bearing 3, and connected to the frame member 5 by means of a U-shaped clip 11 as best shown in Fig. 1.

A bearing and coupling member 12 is fixedly mounted in the bracket 9 in any suitable manner, and a brake actuating shaft 13 is slidably journalled in the bearing member 12 and is provided with an enlarged threaded portion 14 adjacent one end forming a thrust shoulder 15 at the point of enlargement.

A nut 16 is threaded on the end of the shaft 13 and has fixed thereon in any suitable manner a pad 17 of friction brake material located adjacent the outer portion of the brake disc 7.

A cylindrical cup-shaped member 18 is slidably mounted on the nut 16 and non-rotatably connected therewith as by means of a spline 19. A pad 21 of friction braking material is fixedly mounted in any suitable manner in the bottom of the cup 18 in alignment with the braking pad 17 of nut 16.

Cup member 18 is provided at its open end with lugs 22 arranged to engage similar lugs 23 on the coupling member 12 so as to non-rotatably connect these members while permitting longitudinal movement of the cup member.

A thrust bearing between said cup member and the actuating shaft 13 is provided in the form of a thrust ring 24 located on shaft 13 and seated against the shoulder 15 thereon, and a lock ring 25 seated in a groove in the interior of the cup member 18. Said lock ring is yieldingly held in bearing engagement with the ring 24 by means of a compression spring 26 which bears at one end against the lock ring and at its other end against the bearing member 12 on which it is seated. A dust cap 27 is preferably arranged to surround the coupling between the cup member 18 and bearing member 12 in order to exclude dust therefrom.

Cup member 18 is provided with a slotted opening 28 through which the brake disc 7 extends so the outer portion of the brake disc is located between the brake pads 17 and 21.

Manually operable means for rotating the shaft 13 is provided in the form of a lever 29 (Fig. 1) rigidly mounted on the end of said shaft, and a Bowden wire 31 coupled to the end of lever 29 as shown at 32 and traversing a flexible sleeve 33 which extends to a suitable operating mechanism not illustrated, located conveniently to the operator.

Means for limiting movement of the shaft 13 to the left in Fig. 2 is provided in the form of a thrust ring 34 located between the lever 29 and the adjacent shoulder 35 of bearing member 12, the lever being normally held against said thrust ring by the expansive force of the compression spring 26 as transmitted through the lock ring 25 and thrust bearing 24.

The parts are so dimensioned and adjusted that when idle they occupy the position shown in Fig. 2 with the brake pads 17, 21 spaced slightly from the sides of the brake disc 7. When it is desired to apply the brake, the operator applies tension to the Bowden wire 31, thus moving the shaft 13 in a counterclockwise direction as viewed in Fig. 1.

Rotation of the nut 16 is prevented by its splined connection with the cup 18, which latter is prevented from rotation by its coupling connection with the fixed bearing member 12. Rotation of shaft 13, therefore, causes the nut 16 to be traversed to the left in Fig. 2, moving it into contact with the brake disc 7. The reaction of this screw-jack action is transmitted from the screw shaft 13 through the thrust ring 24 to the cup member 18, causing it to move to the right in Fig. 2 against the pressure of spring 26 until the brake pad 21 is also brought into engagement with the surface of brake disc 7, this longitudinal movement being permitted by the slidable coupling connection 22, 23 between the cup and the bearing member 12. Further rotation of shaft 13 by the operator causes the brake pads 17, 21 to be pressed against the opposite sides of the disc 7 so as to retard rotation of said disc and wheel hub 1 to the desired degree, the pressure of the brake pads on the disc being substantially equalized by the floating connection of the movable parts with respect to the fixed bearing member 12.

When the operator releases the Bowden wire 31, the parts are returned to their idle positions, as determined by engagement of the nut 16 against the thrust ring 24, and engagement of the lever 29 against the thrust washer 34.

Although but one embodiment of the invention has been shown and described in detail, it will be understood that changes may be made in the precise construction and arrangement of the parts without departing from the spirit of the invention.

I claim:

1. In combination with a vehicle wheel having a hub, an axle, and a frame member affixed to the axle, a brake disc mounted on said hub to rotate therewith, a brake support fixed to the axle and frame member, a bearing fixedly mounted in the support, a shaft journalled in the bearing having a threaded portion, a nut threaded on said shaft, a brake pad fixed to the nut and movable thereby into and out of engagement with the brake disc, a cup member slidably but non-rotatably connected to the support and having a splined connection with the nut, said cup member having a lateral opening into which the brake disc projects, a second brake pad in the bottom of the cup in position to engage the brake disc, a thrust bearing between the screw shaft and cup, and means for rotating said shaft.

2. A vehicle brake as set forth in claim 1 in which said thrust bearing limits the longitudinal movement of the nut in the cup member and thus forms an abutment which limits the separation of the brake pads from the brake disc.

3. In a vehicle brake mechanism, a brake disc rotatable with the vehicle wheel, a support fixed to the vehicle frame, a bearing and coupling member fixedly mounted in said support, an actuating shaft slidably journalled in the bearing having an enlarged screw-threaded portion at one end, a nut having a brake pad threaded on the shaft, a tubular member closed at one end splined on the nut and slidably coupled at its other end to said bearing and coupling member; a second brake pad in the closed end of the tubular member spaced from the first brake pad, said tubular member having a slot in its side through which the brake disc projects between the brake pads, a thrust bearing connecting the tubular member and actuating shaft, and means for rotating said shaft.

4. Vehicle brake mechanism as set forth in claim 3 in which said thrust bearing comprises a ring member seated on the actuating shaft and bearing against the end of the threaded portion thereof and a lock ring seated in the interior of the tubular member, and a compression spring located between said lock ring and the coupling member.

5. Vehicle brake mechanism as set forth in claim 4 including further, means for limiting sliding movement of the shaft in the bearing and coupling member toward the brake disc under the influence of said compression spring.

6. In combination with a vehicle wheel having a hub, an axle, and a frame member affixed to the axle, a brake disc mounted on said hub to rotate therewith, a brake support fixed to the axle and frame member, a bearing fixedly mounted in the support, a shaft journaled in the bearing having a threaded portion, a nut threaded on said shaft, a brake pad fixed to the nut and movable thereby into and out of engagement with the brake disc, a cup member having a splined connection with the nut and having a lateral opening into which the brake disc projects, a second brake pad in the bottom of the cup in position to engage the brake disc, a thrust bearing between the screw shaft and cup, and means for rotating said shaft, the cup member being slidably but non-rotatably connected to the support; and including yielding means urging the cup in the direction to separate its brake pad from the brake disc.

7. In combination with a vehicle wheel having a hub, an axle, and a frame member affixed to the axle, a brake disc mounted on said hub to rotate therewith, a brake support fixed to the axle and frame member, a bearing fixedly mounted in the support, a shaft journaled in the bearing having a threaded portion, a nut threaded on said shaft, a brake pad fixed to the nut and movable thereby into and out of engagement with the brake disc, a cup member having a splined connection with the nut and having a lateral opening into which the brake disc projects, a second brake pad in the bottom of the cup in position to engage the brake disc, a thrust bearing between the screw shaft and cup, and means for rotating said shaft; the cup member being slidably journaled on the nut, and the screw shaft being free for limited longitudinal movement in the support bearing.

E. ELLIOTT HOOD.

REFERENCES CITED

The following references are of record in the file of this patent:

UNITED STATES PATENTS

| Number | Name | Date |
| --- | --- | --- |
| 1,189,355 | Ellett | July 4, 1916 |
| 2,013,492 | Gorton | Sept. 3, 1935 |
| 2,485,086 | Cagle | Oct. 18, 1949 |

FOREIGN PATENTS

| Number | Country | Date |
| --- | --- | --- |
| 898,474 | France | Apr. 24, 1945 |